United States Patent
Marion et al.

[15] 3,703,066
[45] Nov. 21, 1972

[54] APPARATUS FOR FEEDING HEAT SHRINKABLE PLASTIC FILM AND CAPPING CONTAINERS THEREWITH

[72] Inventors: Thomas E. Marion; Godfrey M. Priborsky, both of Baltimore, Md.

[73] Assignee: Maryland Cup Corporation, Owings Mills, Md.

[22] Filed: Jan. 5, 1971

[21] Appl. No.: 103,984

[52] U.S. Cl. ..................... 53/296, 53/329, 53/389, 83/153, 83/277, 156/517, 156/552, 156/576, 226/165, 226/167
[51] Int. Cl. ............................................ B65b 7/28
[58] Field of Search ..156/552, 576, 517; 53/39, 329, 53/389, 296; 226/158, 162, 167, 165, 196, 199; 83/153, 277

[56] References Cited

UNITED STATES PATENTS

| | | | |
|---|---|---|---|
| 3,507,093 | 4/1970 | Marion | 53/141 |
| 3,286,437 | 11/1966 | Cole | 53/296 |
| 3,505,781 | 4/1970 | Loewenthal | 53/329 |
| 2,720,261 | 10/1955 | Koch | 226/158 |
| 1,261,310 | 4/1918 | Smith | 83/277 |
| 3,468,464 | 9/1969 | Olson et al. | 226/162 |

*Primary Examiner*—Daniel J. Fritsch
*Attorney*—Birch & Birch

[57] ABSTRACT

A feed mechanism is provided for a roll of sheet material, said material being shrink film for capping and closing the open end of a container. The feed of the film is directed downward from the roll and faked as it is unrolled around a tension rod freely mounted in vertical elongated openings formed in spaced brackets and holding the film suitably taut by the weight of the rod. Also, during pay-out of the film from around the freely mounted rod, a timer cam is rotated at the top of the machine to activate a pair of spaced clamps with gripping fingers to a clamping position of the free end of each corner of the film and to pull the film sheet a predetermined distance to cover the open top of a container to be capped and sealed. The clamps are normally spring closed, until one-way cam means momentarily open the same just prior to the clamping action on the film to receive edge portions of the film and then released to close over said film to pull the film sheet for the said predetermined pull distance. A linkage is timed by the timer drive cam and is operated to transversely cut the sheet into a portion with a sufficient marginal portion to overhang the open mouth of the container. The container is mounted on an elevator means to be elevated into a heat sealing area, so the marginal area is sealed by heat over the top of the container, whereupon when the elevator is lowered the capped container may be removed and the film feeding and capping repeated.

9 Claims, 9 Drawing Figures

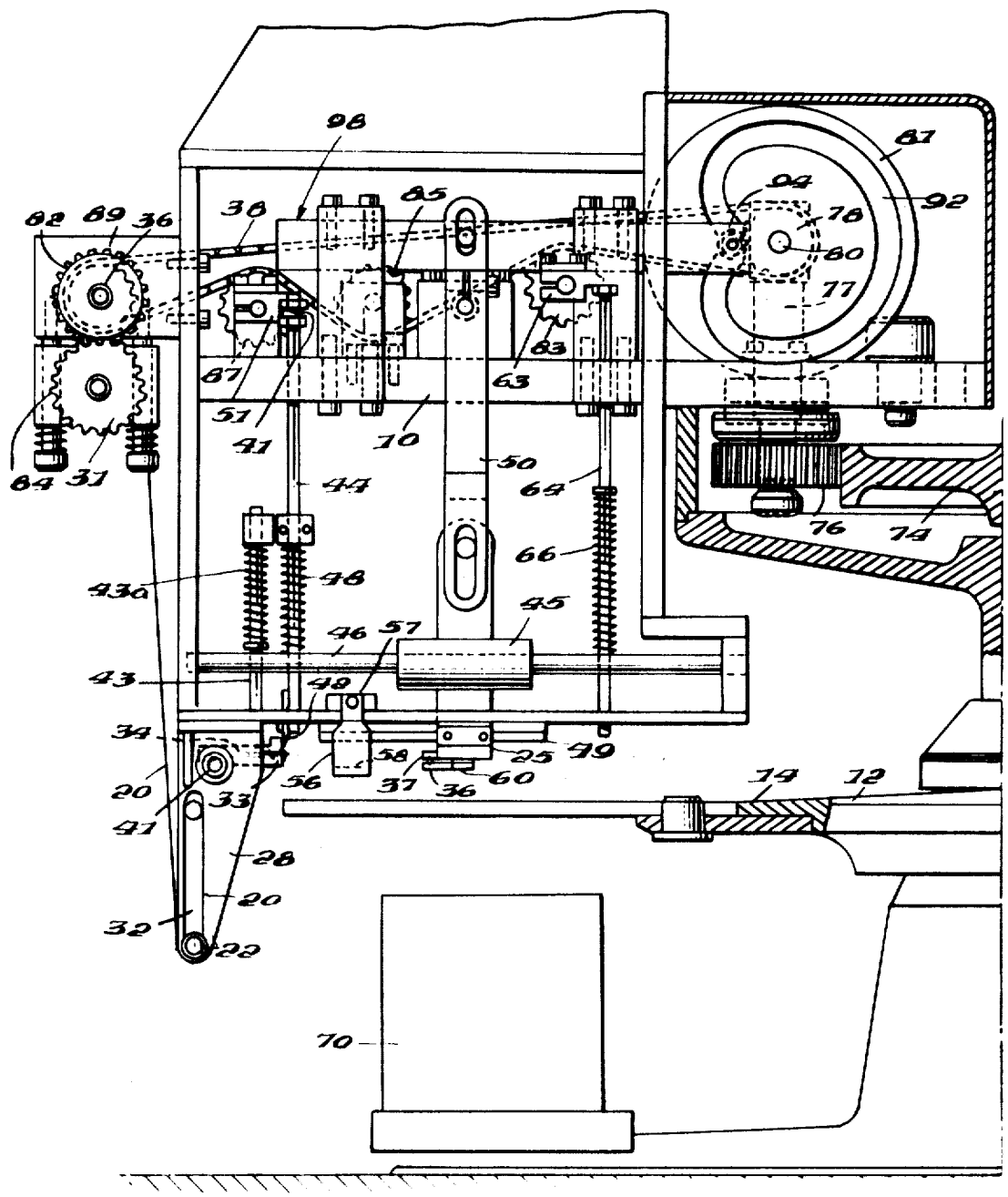

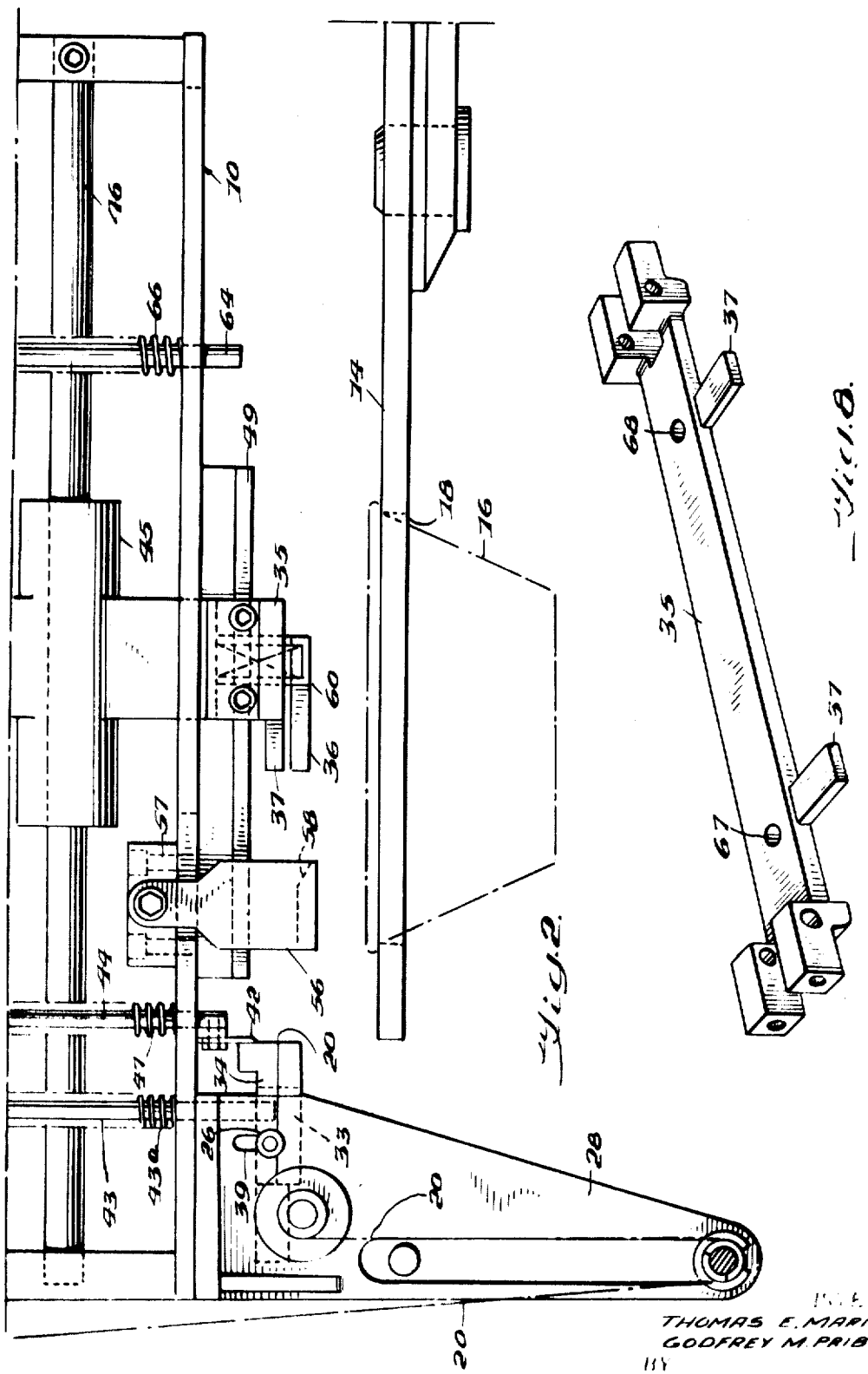

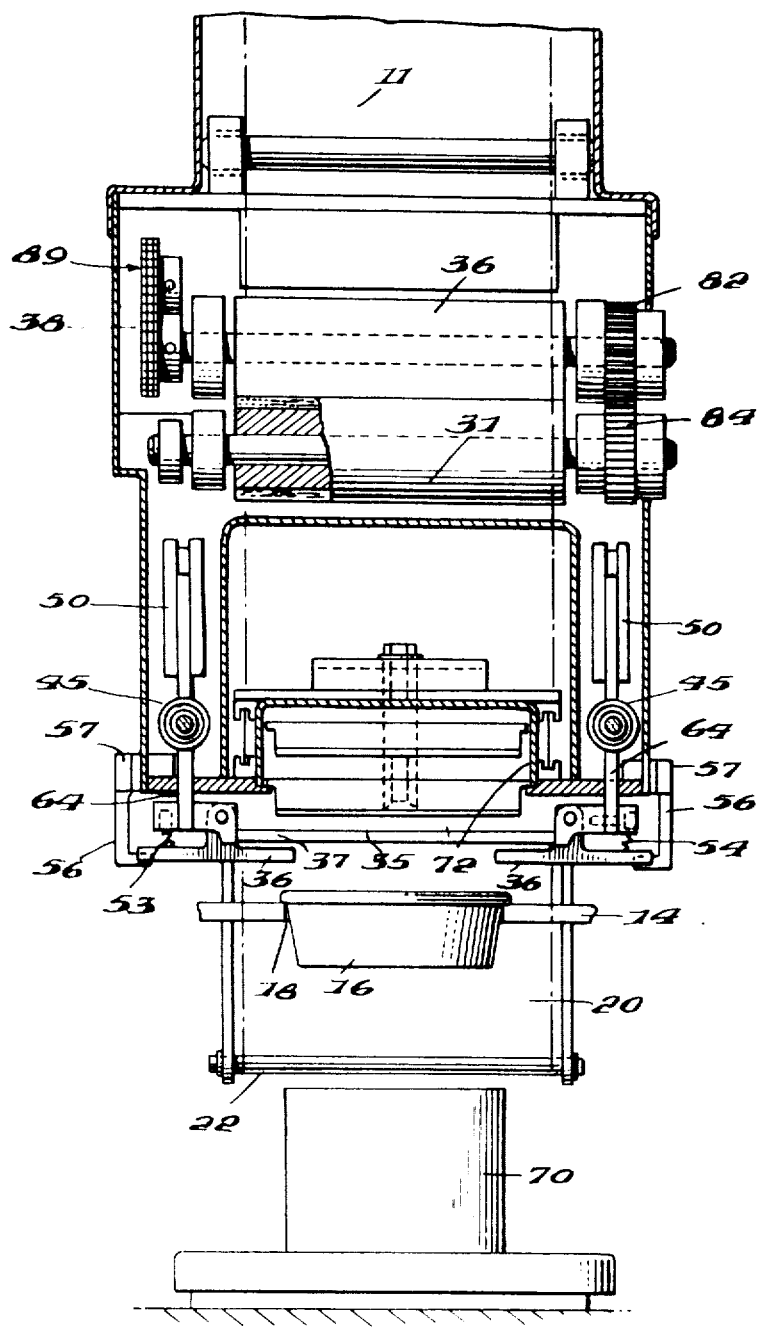

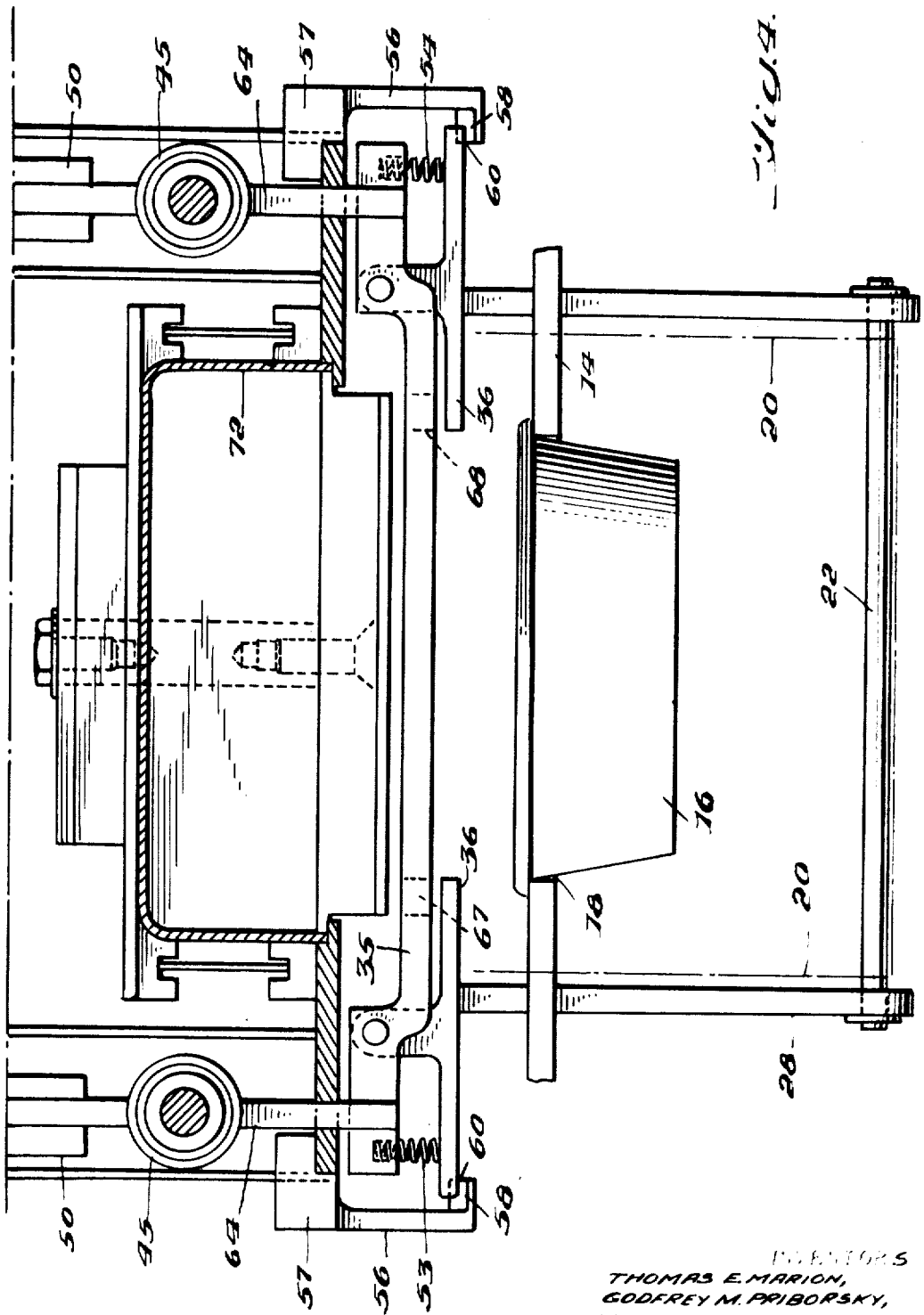

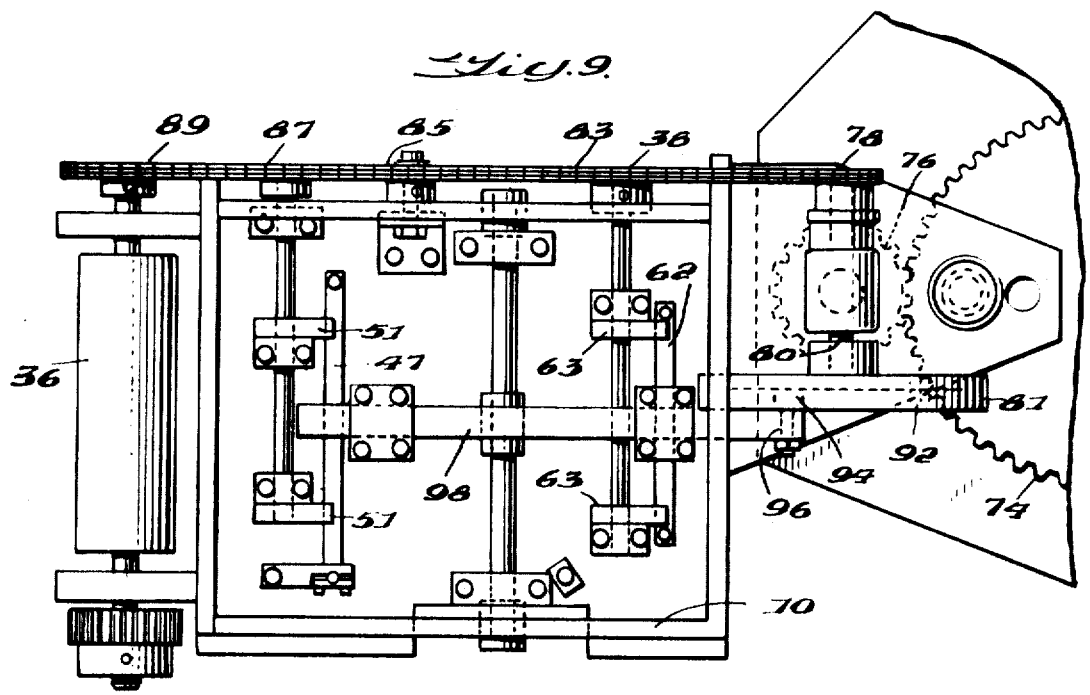
Fig. 9.
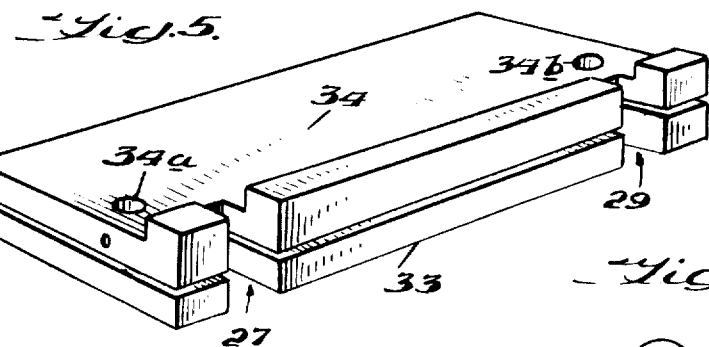
Fig. 5.
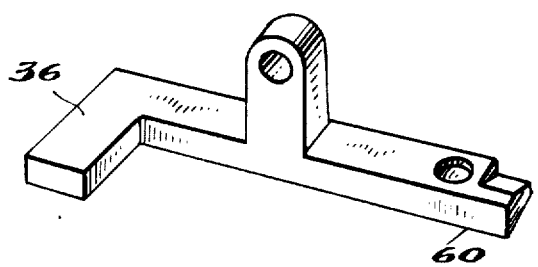
Fig. 6.
Fig. 7.
INVENTORS
THOMAS E. MARION,
GODFREY M. PRIBORSKY,
BY Birch and Birch
ATTORNEYS

APPARATUS FOR FEEDING HEAT SHRINKABLE PLASTIC FILM AND CAPPING CONTAINERS THEREWITH

This invention relates to capping machinery for sealing containers with heat shrinkable plastic film and means for handling the film to automate the feeding and capping procedure. Particularly, the present invention relates to new and novel apparatus for feeding the flexible heat shrink film into the sealing area including a new and novel film gripping, feeding and cutting mechanism fully synchronized with a container feeding and capping mechanism to fully automate the feeding and capping of such containers with flexible heat shrink film.

It is a primary object of this invention to provide a new and novel flexible film feed device for container capping machinery.

It is another object of the present invention to provide a new and novel container capping apparatus for sealing containers with heat shrink plastic film, wherein the film feeding mechanism is fully synchronized with the container capping mechanism.

Still another object of the present invention is to provide a new and novel mechanism for capping containers with a heat shrink plastic film including a new and novel film feeding, positioning, cutting and sealing mechanism.

These and other objects of the present invention will become more fully apparent with reference to the accompanying specification and drawings which relate to a preferred embodiment of the invention. In the drawings:

FIG. 1 is a side elevation view of the assembled machine;

FIG. 2 is an enlarged side elevation view of the machine to show the lower portion of the film feed, cutter means, rock arm and clamp means with a cup in position;

FIG. 3 is a cross section taken of the rear end of the machine showing the release rods and heating and sealing chamber;

FIG. 4 is an enlarged section view of the front end of the machine about to pick-up the lead edge of the film;

FIG. 5 is a detail of the notched guide plates;

FIG. 6 is a perspective of one of the rock arms and its cam rise for engagement with a mating rise on the lower clamp finger;

FIG. 7 is a detail view in perspective of the lower clamp finger unit;

FIG. 8 is a detailed perspective of the upper clamp bar and upper clamp fingers, and FIG. 9 is a top plan view of the drive mechanisms of the machine for the knife and release rod heads.

A machine for capping containers with heat shrink film is shown in prior U.S. Pat. No. 3,507,093 to Marion, Apr. 21, 1970. The disclosure of this patent is incorporated herein by reference to the extent that it shows a similar method of raising a container into proximity to a flexible heat shrink plastic film and then sealing said film about the open rim of the container.

In the present invention means are provided for maintaining a free loop of flexible film material from a reservoir roll or supply roll such that a minimum of resistance to feeding a heat shrinkable plastic film over the open mouth of a container by the novel film feeding mechanism of the present invention is not unduly impeded by the weight of the supply roll. A free edge of the film extends from the free loop to a predetermined input position in the capping machinery where it is positioned and adapted to be gripped by reciprocating gripping means operating in synchronism with a knife blade to draw the film into the capping area of the capping machine and then sever this film adjacent the input position with the knife blade and synchronously release the drawn end of the film immediately subsequent to cutting such that the film is then left in a proper position to be disposed across the mouth of a container and sealed thereon by heat shrinking around the rim of the container. A cam drive is provided to fully synchronize the film advance, film cutting, container feeding and container sealing steps in the machine.

Referring in detail to the drawings and first with particular reference to FIGS. 1, 2 and 3, the present machine comprises a frame 10 with a standard support means 12 on which is journalled a revolvable nest plate 14 for carrying and supporting cups 16. These cups are singly presented to be positioned in an opening 18 formed in the plate 14 below a film sheet 20.

This film is supplied from a feed roll 11 of the film downward and around a tension rod 22 of a loop control means, see FIG. 1. This control means comprises a pair of spaced apart brackets 28 each formed with elongated slots 30 and 32 to permit gravitational movement of the tension rod 22 floating in the slots therein between the brackets to form a fake of the film around the rod 22. For example, a tension or pull is provided on the film sheet 20, as it reeves from the main supply roll by feeder one-way clutch rollers 31 and 36, which are driven by chain and sprocket drive 38 mounted at the top of the frame.

The film 20 loops from the supply roll 11 around the tension rod 22 mounted transversely between spaced brackets 28. Each bracket is formed with an elongated vertical slot 30 and 32 so the rod may be moved upwardly or downwardly in the respective slots in response to tension on the fake of film.

From the tension rod the film feeds upward and reeves around on idler roller 41 into a space between upper and lower film guide plates 33 and 34, which are arranged to hold this part of the film therebetween with the aid of anti-slipback roller 41 and spring pressed film holding rod means 43 and return spring 43a, which extend into openings 34a, 34b in upper guide plate 34, see FIG. 5. Each guide plate is notched with a cut-out section 27 and 29 to expose the corner leading section of the film 20 threaded between the plates to receive the clamp fingers 36 and 37, see FIGS. 2 and 5.

In FIG. 2 are shown the upper and lower guide plates 34 and 33, and upper plate 34 includes means to vertically adjust the upper plate with respect to the lower plate. This means comprises an elongated slot 39 in the bracket 28 with an adjustable set screw 26, see FIG. 2.

The clamp assembly comprises a top finger gripping bar 35 with upper finger members 37 formed from the bar, see FIG. 8. This bar also includes the openings 67 and 68 for each of the film release rods 64 to project through into engagement with the pivoted carrier for the lower fingers 36 to provide for release of the film 20 from between fingers 36 and 37 after it is pulled from the guide plates 33 and 34 at notches 27 and 29 and the knife has severed the pulled out portion of the film into position over the top of the container 16.

Just beyond the leading edges of the guide plates 33 and 34 is a transverse knife blade 42 which knife is carried by a knife holder header bar 47 comprised of vertically spaced rod means 44 one on each side of the machine having return springs 48 on each rod means. These rods are mounted in cross rod 47 which is impact driven by a timed drive unit with a master cam wheel and timer gear mounted at the top of the machine frame, hereinafter described in detail.

This knife is timed by the connection to be driven down by impact of the eccentric drives 51 at the top of the machine to cut the film after the gripping fingers 36 and 37 of each clamp means carried by a respective traveling head 45 for each side. These heads 45 are slidable forward along guide bars 46 by an intermediately pivoted pair of links 50, one for driving each head on each side of the machine, see FIG. 1. From driven connection with said timed mechanism at the top of the machine frame, the mechanisms serve to control the knife and also subsequent release of the clamp fingers 36 and 37 when the film 20 is pulled forward a predetermined distance from the guide plates 33 and 34.

The gripping fingers 36 and 37 are momentarily held open against the bias of the spring means 53 and 54 of the clamp means by a pivot arm 56, one for each clamp assembly formed with a lateral cam rise portion 58 adapted to engage the leading edge 60 of the lower pivoted grip finger 36, see FIGS. 2, 3, 4, 5 and 6. The cam dwell period of the cam rise 58 is only momentary and then releases the clamp fingers 36 and 37 to permit them to be closed by the springs 53 and 54 over the film edge, see FIG. 4. Simultaneously and continuously the drive means starts retraction of the film with the pull of a predetermined film section of a size to bridge with a slight margin over the top of a cup 16 seated in the nest plate 14 and in a position to be raised by an elevator 70; and synchronously therewith at a predetermined time in the drive cycle the knife 42 severs the film at the exit edge of the film from between the guide plates 33 and 34. Also, as the film is pulled forward by the fingers of the clamp means for a proper portion of the sheet 20, the cam drive causes sprocket 83 to drive the eccentrics 63 and cross head 62 with film release rods 64 and springs 66 to project them downward through the openings 67 and 68 in bar 35 and thereby release the clamp fingers 36 and 37 from the film ends for takeover by the elevator means below the heating and sealing chamber. The cup is then raised by the elevator means 70 which may be like the lift shown in U.S. Pat. no. 3,507,093 into the heater and sealer chamber 72 to seal the film to the lips of the cup, see FIGS. 1, 4 and 9.

The drive now causes the traveling heads 45 with their respective clamp means to start return to pick-up position and the next gripping action of the fingers 36 and 37 of a portion of the film edge at the cut out portions 27 and 29 of the guide means 33 and 34 is repeated in the same manner, as in the case of the first cycle of operation, while heating and sealing of the film cup 16 is completed and the capped cup is manually removed from the elevator 70 which has lowered to permit removal of the capped cup from the heat and seal chamber.

The various parts of the mechanism are driven from power means in the form of suitable drive main gear means, such as a main drive gear 74 in mesh with a reduction gear 76 on miter gear unit 77 keyed to a cam shaft 80, on which is keyed the cam 81. A sprocket 78 on cam shaft 80 forms a part of a chain drive 38. The drive chain 38 alternately engages with sprockets 83, 85, 87 and around a sprocket 89 on the roller 36 of the film feed rollers driven by the sprocket 78 on cam shaft 80, see FIGS. 1 and 9. The film feed roller 36 drives roller 31 thru gears 82 on roller 36 and 84 on roller 31, see FIGS. 1 and 9.

The cam shaft 80 carries the master cam 81 having a specifically calibrated heart-shaped cam track 92 engaged by a follower roller 94 on a laterally extended stub shaft 96 from a horizontally reciprocatable bar 98 which drives the link 50.

The eccentrics rotate when the chain drive rotates the sprockets 83, 85, 87 and 89 driven by sprocket 78 on the master cam shaft 80 which is driven through miter gear unit 77 by main gear 76 in a predetermined synchronous manner, so the knife 42 is lowered to sever a portion of the film sheet at the proper time for each predetermined engagement of the clamp fingers 36 and 37 at the notches 27 and 29 of the guide plates 33 and 34 with a corner leading edge of the film in the exposed cut-out portions between the plates. These guide plates provide for threading the film forward to have the cut-out sections at each edge to permit the clamp fingers 36 and 37 to engage the edges of the film 20 after the clamps are spring closed by the respective springs 53 and 54 after departure from the cam rises 58 on the pivot arms 56 at each side of the machine. These arms are mounted adjustably on pivot arm mounting block 57, see FIGS. 1 and 2.

The clamp means assemblies each depend from the respective traversing heads 45 slidable on bars 46, one at each side of the machine. The clamp heads are each driven by crank or link means 50 oscillated on pivot means as the master heart-shaped cam 92 and the chain drive 38 operate to impart sliding movement of the traversing heads 45 to move the clamp means back and forth on their respective guide bars 46. As the clamp means move toward the captured edge of the film 20 threaded between the lead-in guide plates 33 and 34, see FIG. 1, the leading edges 60 on the lower clamp finger 36 engage with the cam surface 58 on each of the rock arms 56 adjacent thereto. This causes the clamp means fingers to open momentarily to fit over the free edge of the film 20 exposed at the cut-out parts 27 and 29 of the plates 33 and 34 for the momentary dwell of the cam surfaces 58 and to be spring closed over the exposed film edges by the clamp springs 53 and 54, see FIG. 4. Then as the links 50 retract the clamp assemblies and traversing heads thereof, the one-way rock arms 56 are engaged by the trailing edges of the lower fingers 36 and swing upward to permit the clamp assemblies to move freely by the arms with the film 20 gripped therebetween, until the master cam shaft 80 driving sprocket 78 causes the knife carriage rods to be driven down by sprocket 87 driving the eccentrics 51 and sever the calculated portion of film of a size desired for capping the container 16 on the elevator 70. Such elevator will then elevate the cup 16 from the nest plate 14 pick up the cut film portion over the cup 16 and place both into the heating and sealing chamber 72, until the next cycle begins with event of the fingers again gripping the corners of a new portion of the film 20 and the actuation of the traversing heads 45 on their respective guide bars 46 for a release of the film after a new portion to size is pulled to position over a newly positioned cup 16.

Without further description it is believed that the novel combination and arrangement of parts of the present invention have been sufficiently described and illustrated, to provide a clear understanding thereof as required under the patent statutes.

What is claimed is:

1. In a capping machine for heat sealing shrinkable film over the open mouth of a container, feeding means for continuously feeding sheets of the film from a roll of the same mounted on the machine, comprising: means reeving said film from the film roll downwardly beneath a tension rod of predetermined weight, said rod being freely mounted to move vertically in spaced brackets formed with an elongated opening to fake the film as it pays-out from the roll in excess of an immediate demand for same; superimposed plate means for receiving the free end of said film therebetween from the tension rod, said plate means being cut-out at forward edges to expose free edges of the film positioned therebetween; clamp means movably mounted on frame means; drive means for alternately driving said clamp means to positions adjacent to and removed from said forward edges; one-way cam means pivotally mounted to swing in one direction at each side of the said forward edges of the plate means, said one-way cam means being engageable with cooperating cam means carried by one of said clamp means, said respective cam means having a momentary dwell period to open said clamping means to provide for entry therein of the respective exposed free edges of the said film exposed between said plate means; spring means normally holding said clamp means closed over the exposed free edges of the said film upon disengagement of said respectively engaged cam means; said clamp means being returned by said drive means from the plate-adjacent clamping position, with said film, to a predetermined removed position in which a predetermined portion of said film has been drawn through said plates from the fake thereof; knife means likewise driven by said drive means to sever said film into said predetermined portions; elevator means supporting a container beneath said predetermined portion of film; and release means, actuated by said drive means when said clamp means is in said removed position and subsequent to the actuation of said knife means, constraining said clamp means to release said film portion over said container.

2. The invention defined in claim 1, wherein said feeding means further comprises second clamp means, synchronized with said knife means and driven by said drive means, engaging said film means to maintain same in position between said plate means during and subsequent to severing said film and immediately prior to the gripping of said free edges thereof by the first said clamp means.

3. The invention described in claim 1, wherein said clamp means comprises a fixed upper bar and laterally extending film gripping means, and a movable lower film gripping means coacting therewith to clamp said film between said laterally extending means carried by the fixed upper bar and said movable lower film gripping means.

4. The invention defined in claim 1, wherein said clamp means comprises a fixed upper bar and laterally extending film gripping means, and a movable lower film gripping means coacting therewith to clamp said film between said laterally extending means carried by the fixed upper bar and said movable lower film gripping means; and wherein said one-way cam means engages said movable lower film gripping means to open said clamp means immediately prior to the achievement of its plate-adjacent clamping position and subsequently disengages said lower film gripping means, at said plate-adjacent position, to permit said clamp means to grip said exposed free edges of said film.

5. A container capping machine for feeding sheets of suitable flexible heat shrink plastic film from a supply roll of such material into the machine, said machine having means for feeding said material in single ply into position between feed plates for a predetermined exposure therebetween of the free edge of the material, clamp means for gripping and pulling said sheet from between said plates forward in the machine to an area above a container to be capped with said material, a cutting means for transversely severing a portion of the pulled-out material of a predetermined size to provide a cap for a container supported below the pulled-out portion, said cutting means including a spring biased film holding rod adapted to engage the film through the upper position guide plate simultaneously with the severing action of said cutting means, means to release the free edge of the said pulled-out portion, an elevator for raising said container with said severed pulled-out portion into a heating and sealing chamber for capping said container therein with said material, and drive means for providing synchronization of the film material advance, film clamping means reciprocation, forward pull-out of a predetermined portion of material, material cutting with said cutting means, release of said film clamping means and elevation of said cut portion and and container with said elevator means to capping and sealing position in said chamber in timed successive steps.

6. In a capping machine for heat sealing shrinkable film over the open mouth of a container as described in claim 5, wherein the said feed plates are vertically adjustable with respect to each other to vary the distance between the same.

7. A container capping machine as described in claim 5, wherein said cutting means includes a cross head bar, a knife blade, a pair of connecting rods mounting said blade on said bar, eccentric drive means acting on said bar to actuate said bar to a film cutting position and return spring means acting against said cross head bar to bias said knife blade away from said cutting position.

8. A container capping machine as described in claim 7, wherein said means to release the free edge of the pulled-out portion comprises a cross bar, connecting rods carried by said bar, eccentric drive means for reciprocating said cross bar with said rods to move downward to open said clamp means after said knife means has severed a portion of the pulled-out film for capping a container.

9. A container capping machine for feeding sheets of suitable flexible heat shrink plastic film from a supply roll of such material into the machine, said machine having means for feeding said material in single ply into position between feed plates for a predetermined exposure therebetween of the free edge of the material, clamp means for gripping and pulling said sheet from between said plates forward in the machine to an area above a container to be capped with said material, a cutting means for transversely severing a portion of the pulled-out material of a predetermined size to provide a cap for a container supported below the pulled-out portion, means to release the free edge of the said pulled-out portion, said means including a cross bar, connecting rods carried by said bar, eccentric drive means for reciprocating said cross bar with said rods to move downward to open said clamp means after said cutting means has severed a portion of the pulled-out film for capping a container, an elevator for raising said container with said severed pulled-out portion into a heating and sealing chamber for capping said container therein with said material, and drive means for providing synchronization of the film material advance, film clamping means reciprocation, forward pull-out of a predetermined portion of material, material cutting with said cutting means, release of said film clamping means and elevation of said cut portion and container with said elevator means to capping and sealing position in said chamber in timed successive steps.

* * * * *